United States Patent [19]

Bumb

[11] Patent Number: 5,003,416
[45] Date of Patent: Mar. 26, 1991

[54] MAGNETIC TAPE FREE END THREADING ASSISTED BY AIR FLOW BETWEEN REELS

[76] Inventor: Frank C. Bumb, 1000 S. Coast Dr., #Q103, Costa Mesa, Calif. 92626

[21] Appl. No.: 354,506

[22] Filed: May 19, 1989

[51] Int. Cl.$^5$ .................... G11B 5/027; G11B 15/00
[52] U.S. Cl. ................................... 360/85; 360/95
[58] Field of Search ........................ 360/95, 84, 85

[56] References Cited

U.S. PATENT DOCUMENTS

| | | | |
|---|---|---|---|
| 3,890,641 | 6/1975 | Mo et al. | 360/84 |
| 4,413,293 | 11/1983 | Hathaway | 360/85 |
| 4,763,210 | 8/1988 | Grant | 360/84 |
| 4,772,969 | 9/1988 | Grant | 360/85 |
| 4,775,905 | 10/1988 | Kosugi et al. | 360/90 |
| 4,779,150 | 10/1988 | Grant | 360/85 |
| 4,786,011 | 11/1988 | Fujiwara et al. | 360/84 |
| 4,794,475 | 12/1988 | Kosugi et al. | 360/90 |
| 4,855,846 | 8/1989 | Hanatani et al. | 360/84 |

Primary Examiner—John H. Wolff
Assistant Examiner—Craig A. Renner
Attorney, Agent, or Firm—William W. Haefliger

[57] ABSTRACT

A tape transport includes a deck, and magnetic tape supply and take-up reels associated with the deck for rotation to transport magnetic tape along a predetermined path therebetween; rotary head structure disposed along the path and associated with the deck, for interaction with the tape; a rotary capstan carried by the deck to engage and advance the tape along its path; there being an air flow channel along the path for channeling air to flow adjacent the tape and from the supply reel to the take-up reel to assist tape travel to the take-up reel. A rotary apparatus rotatably supports and rotates the take-up reel, and is ported to receive and discharge air flow from the channel.

19 Claims, 3 Drawing Sheets

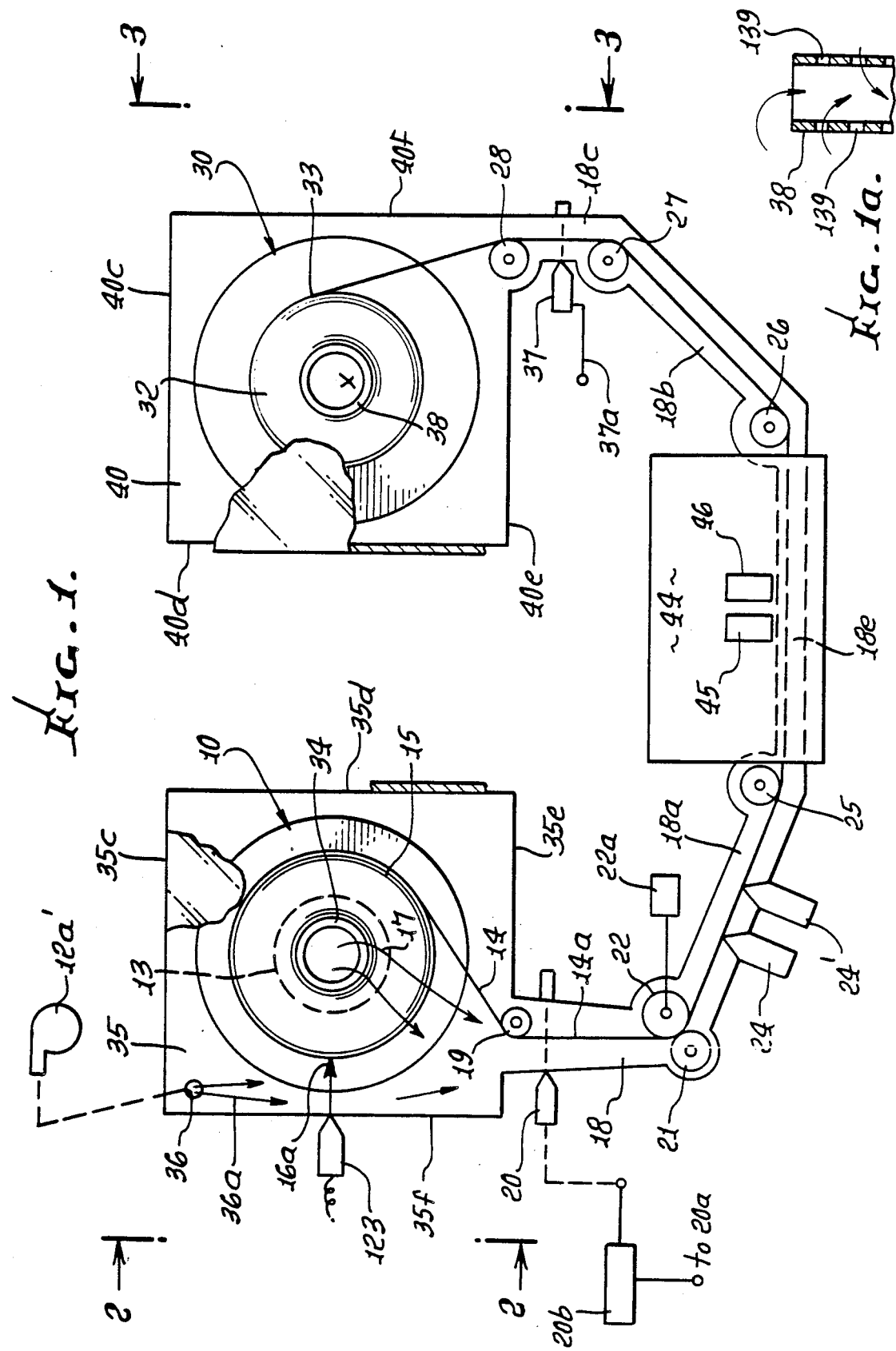

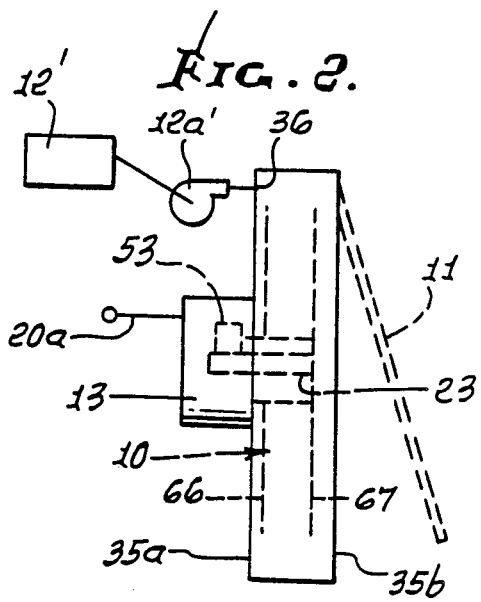
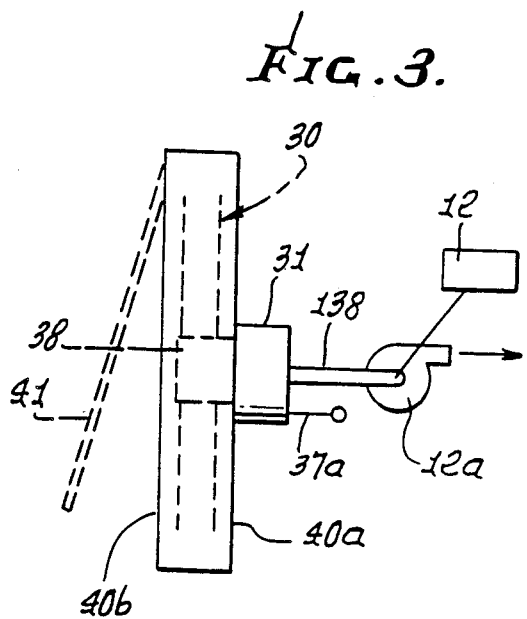
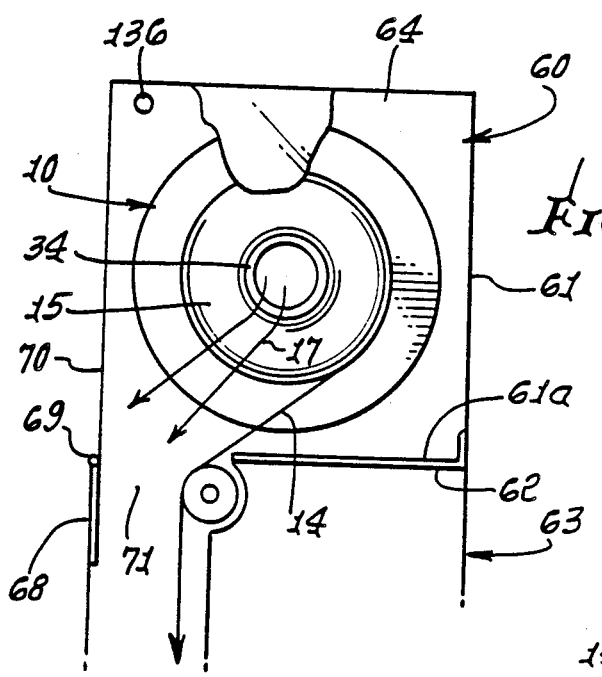
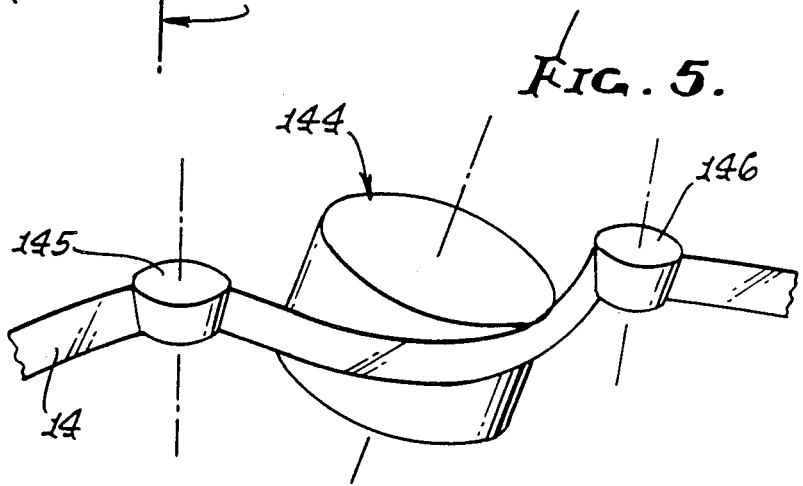

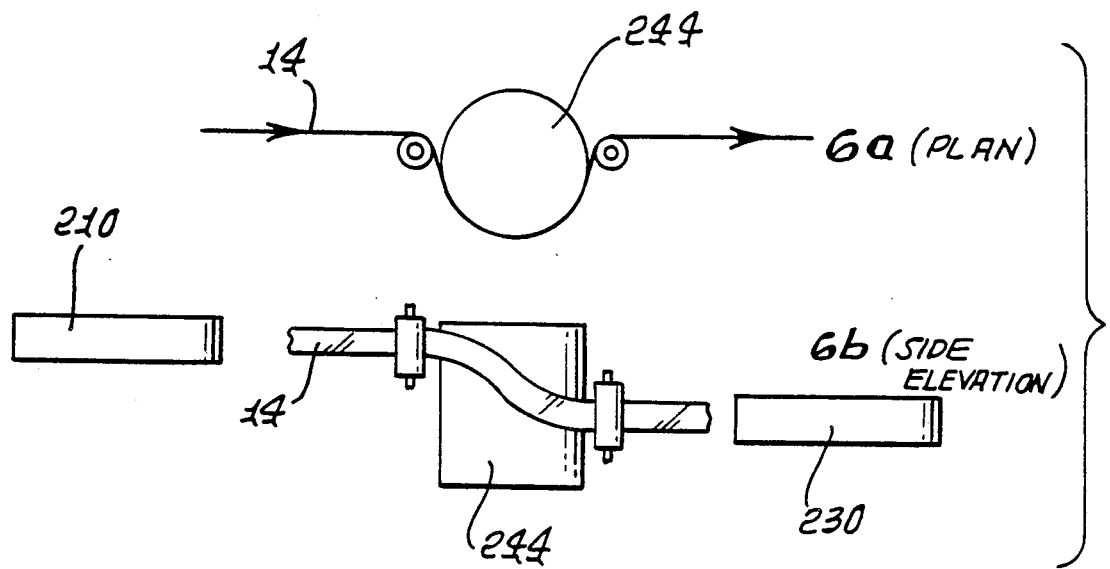
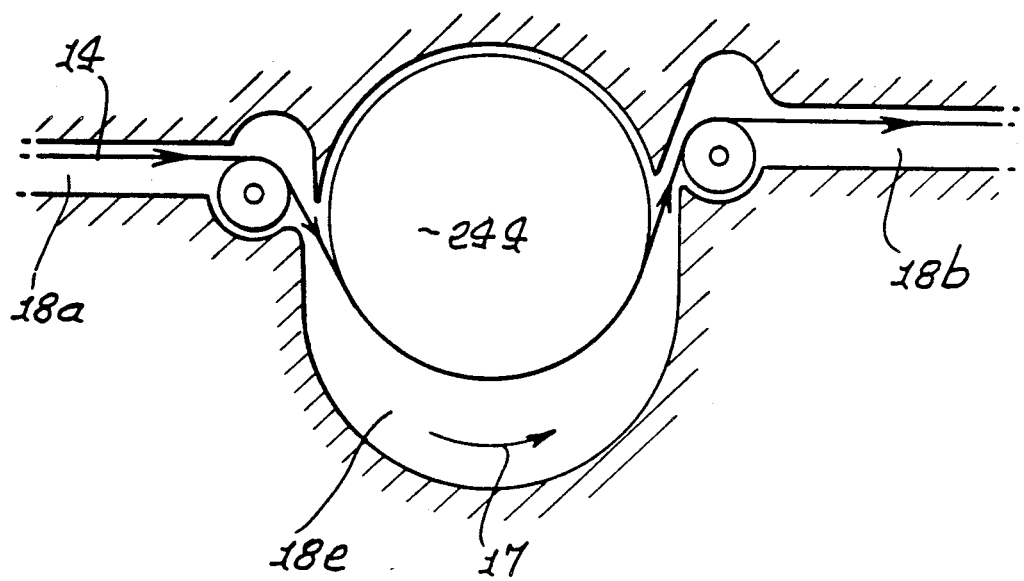

MAGNETIC TAPE FREE END THREADING ASSISTED BY AIR FLOW BETWEEN REELS

BACKGROUND OF THE INVENTION

This invention relates generally to tape transports, and more particularly to said transports wherein air or gas is utilized to feed tape along a channel between tape supply and take-up reels.

Simplification of tape transmitting, loading and threading, between rotating supply and take-up reels is an important objective in the design, construction and operation of magnetic tape transports. This is critical as respects high speed initial threading of the tape lead-end, via a complex tape path, between said reels; and in the past, cumbersome and sometimes unreliable mechanical means were utilized to achieve such threading and transport. There is great need for simple, reliable and simple, inexpensive apparatus to achieve tape threading and transport; and there is need to achieve tape threading at high tape speeds, with simplicity (i.e. without moving transport elements, such as guides, pins, etc.) of the loading mechanism and of the transport mechanism.

SUMMARY OF THE INVENTION

It is a major object of the invention to provide improved apparatus meeting the above needs.

Such apparatus, in accordance with the invention, includes:

(a) a deck, and magnetic tape supply and take-up reels associated with the deck for rotation to transport magnetic tape along a predetermined path therebetween, (b) rotary head or rotary head drums (i.e. read/write means), such as magnetic heads, mounted in rotating cylindrical assembly, disposed along said paths and associated with the deck, (c) a rotary capstan carried by the deck to engage and advance the tape along said path, (d) there being an air flow channel along said path for channeling air to flow adjacent the tape and to the take-up reel to assist tape travel to said take-up reel.

It is a further object to provide a rotary shaft to support and rotate the take-up reel, said shaft being ported to receive and discharge air flow from the channel. Such a take-up reel typically has a tape winding surface with at least one air passing perforation to pass said air flow to a port defined by the shaft; and a blower has its suction side connected in air flow receiving relation with said port defined by the shaft.

Another object is to provide a chamber on the deck that receives the supply reel for rotation therein, there being an air entry port to said chamber and in which air flows past the periphery of the supply reel to said channel. As will be seen, the air entry port is located to pass said air flow past the free end of tape on the supply reel to urge said free end into said channel, as the supply reel rotates.

An additional object involves the provision of a chamber on the deck that receives the take-up reel for rotation therein, as by a rotary shaft, and there being an air discharge port from said chamber and via which air flows across or through the periphery of the take-up reel to discharge from said chamber Further objects include provision of a cartridge associated with said deck, the supply reel located in said cartridge to advance tape from the cartridge into the channel in the deck; and provision of a rotary head drum having fixed and rotating cylindrical surfaces along which the tape travels in a helical path as the tape travels along said path. This allows tape travel between two spaced planes. In this regard, the two reels may be in two different planes, and they may be co-axial, or out of axial alignment.

The invention finds especially advantageous use in video or rotary head apparatus.

These and other objects and advantages of the invention, as well as the details of an illustrative embodiment, will be more fully understood from the following specification and drawings, in which:

DRAWING DESCRIPTION

FIG. 1 is a plan view of a tape deck, showing components;

FIG. 1a, is a section of a perforated hub;

FIG. 2 is an end view on lines 2—2 of FIG. 1;

FIG. 3 is an end view on lines 3—3 of FIG. 1;

FIG. 4 is a plan view of a tape cartridge usable with the FIG. 1 apparatus;

FIG. 5 is a perspective view of a rotary head drum;

FIG. 6 is a plan view of modified apparatus having rotating tape guides, and a rotary head drum perpendicular to the transport plane; and FIG. 7 is a plan view of apparatus as seen in FIG. 6, but modified to have air flow channels.

DETAILED DESCRIPTION

In FIG. 1, a tape supply reel 10 is mounted on an axial tube 34 for rotation by that tube, as by a rotary drive 13. The reel is confined in a chamber 35, whose walls are indicated at 35a—35f. The tape is wound in a pack 15 on that reel and a tape end portion appears at 14.

A take-up reel 30 is mounted on an axial tube or hub 38, for rotation by 38, driven by rotary drive 31. That reel is confined within a chamber 40, whose walls are indicated at 40a—40f. The tape winds onto a pack 32 on the reel.

The reel 10 can be a conventional reel of tape with, for example, a NAB hub and standard flanges. The reels may be inserted through doors 11 and 41 at the planes of walls 35b and 40b, the doors closed and the reels automatically centered on their hubs. Ports 36 (with an air filter) allow air to enter chamber 35. An air blower 12a, controlled at 12 and similar in pressure-flow capabilities to a vacuum cleaner, blower, or impeller, is connected through a hollow axial shaft or tube 138 to the take-up hub, and controlled as to impeller speed by control 12; the blower is connected so that the low pressure (suction) side connects to the axial tube 138 (shaft) and air flows across the perforated circumference of the take-up hub (with no tape yet wrapped on the circumference) and into (perpendicular to) the plane of FIG. 1, as indicated by X in FIG. 1. See FIG. 1a hub 38, with perforations or ports 139. Reel 30 is usually captive, with a perforated circumference.

From the high pressure, or entry side, air enters the system through filtered port or ports 36, and then passes at 36a along the circumference of the supply pack, past the first guide 19, down the channels 18 and 18a, through or past the rotary head drum 44, along channel lengths 18b and 18c, then, out the channel and across the take-up hub perforations 139 into the axial tube 38. FIG. 1 also indicates the alternative use of a blower 12a' for supplying positive air pressure to the system, as via port or ports 36, i.e., in place of or in combination with vacuum operation. Rotary magnetic head drum 44 contains suitable read/write heads indicated at 45 and 46, adjacent air flow channeling 18e in the scanner. The tape threading technique and procedure is as follows:

In operation, the reel 10 is inserted and centered on drive post 23. The door 11 is closed and the drive 12 and fan 12a are turned on. Fan 12a is sequentially turned on after the reel is located and rotation starts. The reel 10 is rotated by its drive 23 counterclockwise for several revolutions to wind any loose tape 14 onto the pack 15. As the end of the tape on the pack passes at approximately the point where arrow head 16a indicates a tangent with the pack, a sensor 123 senses the tape, and turns on the fan drive 12 so that air flow indicated at 17 as entering the chamber 35 via hollow hub 34, having open inlet and outlet ends, causes the tape outer layer to leave the pack circumference and to be carried with the air flow toward the channel 18, as at 14. At approximately the location of the first guide 19, a sensor is located, as at 20 to sense the arrival of the tape 14 at guide 19 or in the channel 18 (as by interrupting an infra-red diode beam or other beam). The sensor output at 20a is fed to the tape drive, which then stops the counterclockwise motion of the pack and initiates clockwise motion of the pack for unspooling tape and allowing the free unsupported tape to travel or flow at 14a with the air down the channel 18. Pinch roller 21 will, of course, be rotated away from the capstan 22 to allow the tape to proceed down the channel. A capstan drive appears at 22a. At one or more points down the channel 18 or threading path, additional sensors can or should be installed to sense the passage of tape at key points. See for example sensors 24 and 24'.

The fan drive 12 can alternatively be actuated when the reel or cartridge is inserted. By winding reel 10 counterclockwise, there is no unwinding of tape, other than the tape end, as that end passes approximately at 16a. (If the fan is "on", the tape loose end will "flop" down [by suction] and block sensor 20 once for counterclockwise revolution.) Counting (via a counter 20b) the number of sensor "blocks" (say revolutions of 10) is a way of knowing threading may proceed, and that the reel 10 can be reversed to advance clockwise, say after the fourth revolution.

It is an important object to provide for reliable, jam-free loading. In this regard employing at 53 a micro processor control of the supply pack 15 for counting turns of the unwinding supply reel (knowing the starting diameter), the length of tape and/or time to actuate the several sensors can be, or is calculated and compared with the time between sensing at key points along the channel 18 to determine if the loading is proceeding satisfactorily, or if the tape should be re-wound and the process re-started.

As tape passes progressively through the channels 18, 18a, 18b, and 18c, as sensed by transducers at chosen spots, the air flow (impeller RPM in fan 12a ) is or can be changed or adjusted to create optimum tape velocity at the particular load point. For example, after the tape passes the last one 28 of the guide rollers 25-28, and before the tape enters the take-up reel chamber 40, it is sensed as at 37. The take-up reel 30 is caused to start rotating, by its drive 31, signaled at 37a. The air flow through channels 18, 18a-18c can be increased (or decreased) to optimize the transit of tape to the tangent point 33 of tape arrival at take-up pack 32. Too much flow causes flutter of the tape and possible mis-loading onto pack 32.

Change of air velocity and direction at desired points along the channel may be controlled to great advantage by causing air to enter the channel (or chamber directly at 36a without passing through the axial tube 34. For example, and as an alternative, air may enter chamber 35 via holes 36 to produce the described air flow (tape flow). Note blower 12a' controlled at 12'.

It is also possible, and in some cases desirable, to have the reel or pack of tape enclosed in a housing (cartridge) for protection of the tape, ease in handling, automating the storage, selection and retrieval of cartridges. In this case the cartridge would have schematic appearance and features shown in FIG. 4. The cartridge 60 has a housing 61 with a wall 61a attachable to the surface or wall 62 of the tape transport 63. Within the chamber 64, corresponding to 35 in FIG. 1, a tape supply reel 10 is provided, with a tape pack 15, as in FIG. 1. Hollow hub 34 supports the tape between reel flanges 66 and 67 (see FIG. 2). A small cartridge door 68 is hinged at 69 to cartridge wall 70, to open, allowing travel of the tape 14 out the opening 71 into the channel 18 of the tape transport, as before. Air enters hub 34 from one end, and passes out its opposite end at 17 to flow to channel 18 as before. An alternate air entry port 136 corresponds to port 36.

On inserting, or connecting the cartridge, the reel hub engages and centers on the captive hub receptor of the transport, to release a brake on the cartridge which prevents reel rotation and tape unspooling while the cartridge is handled outside the transport. A friction pad (circular or otherwise) is beneficial for this purpose to engage the pack periphery and also prevent unwinding of tape, when out of the transport.

Perforations on the hub 34 circumference are useful in the assembly of the cartridge by the manufacturer. The cartridge can then be loaded by an air stream at the factory as the tape is being certified and spooled into the cartridge.

FIG. 1 has been described as respects a configuration with the supply and take-up reels/packs co-planar. In this case the scanner and input and output guides are typically skewed or canted to the plane of the paper, (for reading laterally across the tape which travels helically) as will be described below. Alternatively, rotary head drum assembly can be normal to the plane of FIG. 1, while simultaneously employing the described tape travel path, requiring the supply and take-up reel in parallel planes. In this case the reels are spaced apart as shown in FIG. 1 but in different parallel planes; or the reels can be coaxial. In this case, one reel would be captive, similar to the take-up reel shown, but the supply reel (or cartridge) can be mounted on a hub receptor coaxial with the take-up reel.

FIG. 5 shows a rotary head drum assembly 144 with associated input and exit rotating guides 145 and 146 for tape 14. In this illustration the rotary head drum assembly is inclined to the tape path, allowing supply and take-up reels to be co-planar.

Another configuration, as seen in FIG. 6 with the same mechanics, employs a scanner 244 normal to the plane of FIG. 6, and reels 210 and 230 in parallel planes.

FIG. 7 is like FIG. 6, but details of air flow channels 18a, 18b, and 18e appear.

I claim:

1. In a tape transport, the combination that comprises:
   (a) a deck, a magnetic tape supply reel and a magnetic tape take-up reel associated with the deck for rotation to transport a magnetic tape along a predetermined path therebetween, and including said tape on said supply reel, said tape having a free end, (b) rotary head means disposed along said path and associated with the deck, for interaction with the tape, (c) a rotary capstan carried by the deck to engage and advance the tape along said path, (d) there being an air flow channel extending along said path and away from the supply reel and toward the take-up reel for channeling air to flow lengthwise of the channel adjacent the tape and from the supply reel to the take-up reel and in spaced relation thereto to assist tape free end threading into the channel and tape free end travel in and along the channel to said take-up reel.

2. The combination of claim 1 including a rotary means including a shaft to support and rotate the take-up reel, said rotary means having a port to receive and discharge an air flow from the channel.

3. The combination of claim 2 wherein the take-up reel has a tape winding surface with at least one air passing perforation to pass said air flow to said port.

4. The combination of claim 3 including a blower having a suction side connection in air flow receiving relation with said port.

5. The combination of claim 3 including a blower having its output side connected in positive pressure air flow delivery relation to said port.

6. The combination of claim 1 including a chamber on the deck that receives the supply reel for rotation therein, there being an air entry port to said chamber and in which an air flow passes the supply reel to said channel.

7. The combination of claim 6 wherein the air entry port is located to pass said air flow past the free end of tape on the supply reel to urge said free end into said channel, as the supply reel rotates.

8. The combination of claim 7 including a drive to rotate said supply reel in opposite rotary directions, one direction of rotation tending to wind tape on the supply reel at which time the free end of the tape is urged by the air flow to enter the channel, and there being a sensor to sense tape entry into the channel and to control said drive to reverse its direction of rotation thereby to advance tape from the supply reel into the channel.

9. The combination of claim 1 including tape sensor means to sense tape travel along the channel, said sensor means controlling at least one of the following:

(i) the supply of air to the channel, (ii) the rate of rotation of the supply reel, (iii) the direction of rotation of the supply reel, thereby to optimize travel of the tape to the take-up reel.

10. The combination of claim 1 including a rotary shaft to support and rotate the take-up reel, a chamber on the deck that receives the take-up reel for rotation therein, and there being an air discharge port from said chamber and via which air flows past the take-up reel to discharge from said chamber.

11. The combination of claim 1 including a cartridge associated with said deck, the supply reel located in said cartridge to advance tape from the cartridge into the channel in the deck.

12. The combination of claim 1 wherein the rotary head means has a curved surface along which the tape travels in a helical path.

13. The combination of claim 1 wherein the two reels are in a common plane.

14. The combination of claim 1 wherein the two reels are in different parallel planes.

15. The combination of claim 1 wherein the two reels are co-axial.

16. The transport of claim 1 including means to count turnings of the tape supply reel and sensor means to reuse tape travel along said path, to determine if tape loading is proceeding satisfactorily.

17. In the operation of a tape transport that includes:

(a) a deck, a magnetic tape supply reel and a magnetic tape take-up reel associated with the deck for rotation to transport a magnetic tape along a predetermined path therebetween, and including said tape on said supply reel and the tape having a free end, (b) a rotary head means disposed along said path and associated with the deck, (c) a rotary capstan carried by the deck to engage and advance the tape along said path, (d) there being an air flow channel extending along said path and away from the supply reel and toward the take-up reel for channeling air to flow lengthwise of the channel adjacent the tape and from the supply reel to the take-up reel and in spaced relation thereto to assist tape free and threading into the channel and tape free end travel in and along the channel to said take-up reel, (e) a rotary shaft to support and rotate the take-up reel, said shaft having a port to receive and discharge an air flow from the channel, (f) the take-up reel having a tape winding surface with at least one air passing perforation to pass said air flow to said port, the steps that includes:

(g) applying suction to said port, (h) and transmitting said suction to the supply reel via said path to control threading of the magnetic tape free end between said reels via said path.

18. The method of claim 17 including initially rotating the supply reel in a direction to allow the free end of the tape to flop in response to said suction, and then reversing the direction of rotation of the supply reel to allow tape threading in response to said suction.

19. In the operation of a tape transport that includes:

(a) a deck, and magnetic tape supply reel and a magnetic tape take-up reel associated with the deck for rotation to transport a magnetic tape along a predetermined path therebetween, and including said tape on said supply reel, said tape having a free end.

(b) rotary head means disposed along said path and associated with the deck, (c) a rotary capstan carried by the deck to engage and advance the tape along said path, (d) there being an air flow channel extending along said path and away from the supply reel and toward the take-up reel for channeling air to flow lengthwise of the channel adjacent the tape and to the take-up reel and in spaced relation thereto to assist tape travel in and along the channel to said take-up reel, (e) a rotary shaft to support and rotate the take-up reel, said shaft having a part to receive and discharge an air flow from the channel, (f) the take-up reel having a tape winding surface with at least one air passing perforation to pass said air flow to said port, the steps that include:

(g) applying positive pressure air flow delivery to said port via said path, (h) and driving said supply reel in a rotary direction to assist tape threading to the take-up reel, via said path.

* * * * *

UNITED STATES PATENT AND TRADEMARK OFFICE
CERTIFICATE OF CORRECTION

PATENT NO. : 5,003,416

DATED : March 26, 1991

INVENTOR(S) : Frank C. Bumb

It is certified that error appears in the above-identified patent and that said Letters Patent is hereby corrected as shown below:

Column 6, line 7; "reuse tape travel along said path, to determine if tape" should read --sense tape travel along said path, to determine if tape--

Signed and Sealed this

Tenth Day of November, 1992

Attest:

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 5,003,416
DATED : March 26, 1991
INVENTOR(S) : Frank C. Bumb

It is certified that error appears in the above-identified patent and that said Letters Patent is hereby corrected as shown below:

Column 6, line 7; "reuse tape travel along said path, to determine if tape" should read --sense tape travel along said path, to determine if tape--

Column 6, line 24, "spaced relation thereto to assist tape free and" should read --spaced relation thereto to assist tape free end--

Signed and Sealed this

Fifth Day of October, 1993

Attest:

BRUCE LEHMAN

Attesting Officer

Commissioner of Patents and Trademarks